United States Patent

Balazs et al.

Patent Number: 5,911,868
Date of Patent: Jun. 15, 1999

[54] MEDIATED ELECTROCHEMICAL OXIDATION OF ORGANIC WASTES USING A CO (III) MEDIATOR IN A NITRIC ACID BASED SYSTEM

[75] Inventors: G. Bryan Balazs, Livermore; Zoher Chiba, Moraga; Patricia R. Lewis, Livermore; Norvell Nelson, Palo Alto; G. Anthony Steward, Los Altos Hills, all of Calif.

[73] Assignee: Regents of the University of California, Oakland, Calif.

[21] Appl. No.: 08/986,476

[22] Filed: Dec. 8, 1997

[51] Int. Cl.[6] .............................. C02F 1/461; A62D 3/00
[52] U.S. Cl. ......................... 205/688; 205/703; 205/746; 205/749; 588/204
[58] Field of Search ................................. 205/688, 703, 205/746, 749; 588/204

[56] References Cited

U.S. PATENT DOCUMENTS 4,874,485  10/1989  Steele ........................................ 205/703
5,516,972  5/1996  Farmer et al. ........................... 588/210

*Primary Examiner*—Arun S. Phasge
*Attorney, Agent, or Firm*—Daryl S. Grzybicki

[57] ABSTRACT

An electrochemical cell with a Co(III) mediator and nitric acid electrolyte provides efficient destruction of organic and mixed wastes. The organic waste is concentrated in the anolyte reservoir, where the mediator oxidizes the organics and insoluble transuranic compounds and is regenerated at the anode until the organics are converted to $CO_2$. The nitric acid is an excellent oxidant that facilitates the destruction of the organic components. The anode is not readily attacked by the nitric acid solution, thus the cell can be used for extended continual operation without electrode replacement.

5 Claims, 1 Drawing Sheet

MEDIATED ELECTROCHEMICAL OXIDATION OF ORGANIC WASTES USING A CO (III) MEDIATOR IN A NITRIC ACID BASED SYSTEM

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a method for remediation of organic and mixed wastes by mediated electrochemical oxidation of the organic components to carbon dioxide using a Co(III) mediator in a nitric acid solution.

2. Description of Related Art

Destruction of organic waste through conventional methods such as incineration often encounters political or regulatory hurdles, especially when the waste streams contain radionuclides or chlorinated hydrocarbons, or when harmful species such as dioxins or furans are possible by-products. For this reason, attention has focused on low temperature alternatives. Mediated Electrochemical Oxidation (MEO) is an alternative that avoids many of the problems associated with other organic or mixed waste treatment systems.

MEO oxidizes the organic components of waste to carbon dioxide and water while operating at near ambient pressure and temperature (30–70° C.) in an aqueous system. All waste stream components and oxidation products (except evolved gases) are contained in the aqueous environment. The aqueous electrolyte acts as an accumulator for inorganics that were present in the original waste stream and also provides a thermal buffer for the energy released during oxidation of the organics. The generation of secondary waste is minimal as the process needs no additional reagents. The entire process can be shut down by simply turning off the power, avoiding problems such as thermal runaway.

MEO is based upon the oxidation of organics to carbon dioxide through a series of charge transfer steps involving a mediator. This mediator, typically a transition metal in its highest valency state, is generated at the anode of an electrochemical cell and is dispersed throughout the anolyte solution. Upon oxidation of the organic by the mediator, the reduced mediator species is reoxidized at the anode and the cycle repeats until all oxidizable organic material in the cell is depleted.

Several high-valency metal ions have been investigated as mediators, including Ag(II), Ce(IV), and Fe(III). Each of these systems show different rates with respect to organics oxidation, as well as slightly different optimal waste streams. The silver/nitric acid based system arguably has been the most successful of the three, yet the Ag(II) mediator suffers from the problem of being depleted when chlorinated organics are treated, since AgCl is highly insoluble. In addition, the economic and environmental costs of silver are significantly higher than for the other metals.

A cobalt based system was developed by Farmer et al. at Lawrence Livermore National Laboratory and is disclosed in U.S. Pat. No. 5,516,972. This system uses a sulfuric acid ($H_2SO_4$) electrolyte and has no cell separator. The choice of a Co(III) mediator is advantageous when treating chloro-containing organics because cobalt chloride complexes are generally soluble, so precipitation of chloride salts is avoided. The rate of reaction of Co(III) with water is relatively slow, thus the parasitic reactions of the mediator with water are minimized. In addition, the economic and environmental costs of cobalt as a mediator are smaller than for other metals, particularly silver. Specifically, the RCRA disposal restriction requirements, both at the federal and state level, are less strict for cobalt than for silver.

Yet the Co(III)/($H_2SO_4$) system described in U.S. Pat. No. 5,516,972 has its own drawbacks, which were uncovered upon further study of the system. Although the system has the seemingly attractive feature of no cell separator, the disadvantage of such a system is that the organic waste stream is diluted in the larger, unseparated volume, and more reagents are required to achieve effective concentrations. Furthermore, corrosion of the electrodes was a significant technical problem for this process, as the combination of acidic media, highly oxidizing species, chlorine species, free radicals, and organic fragments drastically shortened the usable lifetime of the electrode materials tested. The sulfuric acid electrolyte solution was identified specifically as a corrosive environment that readily attacks and dissolves the anode. The corrosion of the electrodes is significant not only because it reduces the lifetime of the electrodes, which are typically made of expensive metals, but it causes the electrode material to be released into the waste stream. Waste contaminated with an electrode material such as platinum is hazardous; waste disposal or recovery of the platinum are time-consuming and costly options.

It is the object of the present invention to address the problems inherent in the Ag(II) and Co(III)/($H_2SO_4$) systems and provide a mediated electrochemical oxidation process that efficiently remediates organic and mixed wastes while minimizing the economic and environmental costs of a waste treatment system.

SUMMARY OF THE INVENTION

The present invention is a process for destroying organic-containing wastes by mediated electrochemical oxidation (MEO), whereby the organics are oxidized to carbon dioxide via a Co(III) mediator (or oxidant) in an electrochemical cell with a nitric acid electrolyte. The mediator, Co(III), is cleanly recycled in charge transfer steps at the anode in the electrochemical cell. The cell is separated into reservoirs for the anolyte and catholyte, and the organic material is concentrated in the anolyte. Nitric acid is reduced to nitrous acid at the cathode, and the nitrous acid may be contacted with oxygen gas in the catholyte to regenerate nitric acid. Nitric acid is a strong oxidant which facilitates the destruction of the organics, but does not significantly corrode the electrodes. Acids such as sulfuric acid are severely corrosive and drastically reduce the lifetime of conventional anodes.

The combination of Co(III) and a nitric acid solution allows the conversion of nearly all organics, whether present in hazardous or in mixed waste, to carbon dioxide. Organics that have been treated include Trimsol (a cutting oil), cellulose (including paper and cloth), and plastics (polyvinyl chloride). In general, liquid and solid organics such as alcohols, aldehydes, ketones, carboxylic acids, and aromatics are treatable using the present method. The process may also be used to remove the radioactive component of mixed wastes, while simultaneously destroying the organic components. In particular, organic waste containing transuranic oxides may be treated to convert the oxides to a soluble species that is then recovered by separation and precipitation.

DETAILED DESCRIPTION OF THE INVENTION

The present invention is a mediated electrochemical oxidation (MEO) process that is used to treat wastes containing hazardous organics by converting the organic components of the waste to carbon dioxide. The organics are oxidized by a Co(III) mediator in a nitric acid electrolyte. For mixed wastes, the radioactive components, specifically transuranics, are converted to a soluble form and can be recovered if desired or immobilized for disposal.

Figure 1:
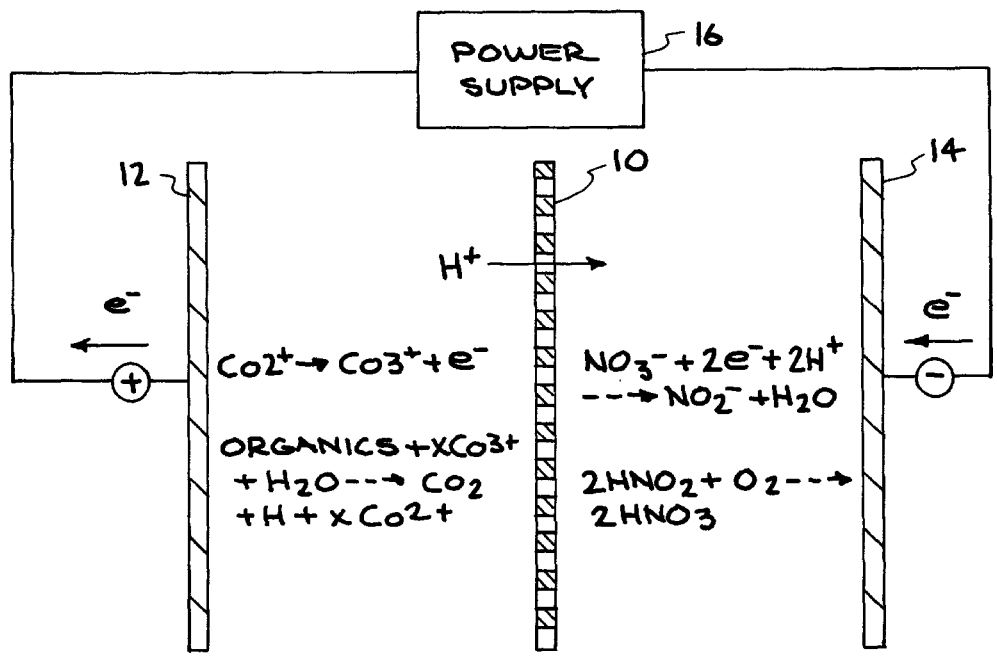
FIG. 1 shows an electrochemical cell arrangement in a single electrode mode and process chemistry according to the present invention.

FIG. 1 shows an illustrative electrochemical cell arrangement (single electrode mode) and process chemistry for the present invention. The electrochemical cell is separated into two reservoirs by a cell separator 10, such as a membrane. One reservoir contains an anode 12 and an anolyte solution, and the other reservoir contains the cathode 14 and catholyte solution. Both anolyte and catholyte contain nitric acid. The anode 12 is typically made of, or coated with, a metal such as platinum, which is resistant to corrosion in nitric acid solutions. Suitable materials for the cathode 14 include niobium, titanium, nickel, platinum, and tantalum. The anode 12 and cathode 14 are driven by a conventional DC power supply 16.

Figure 2:
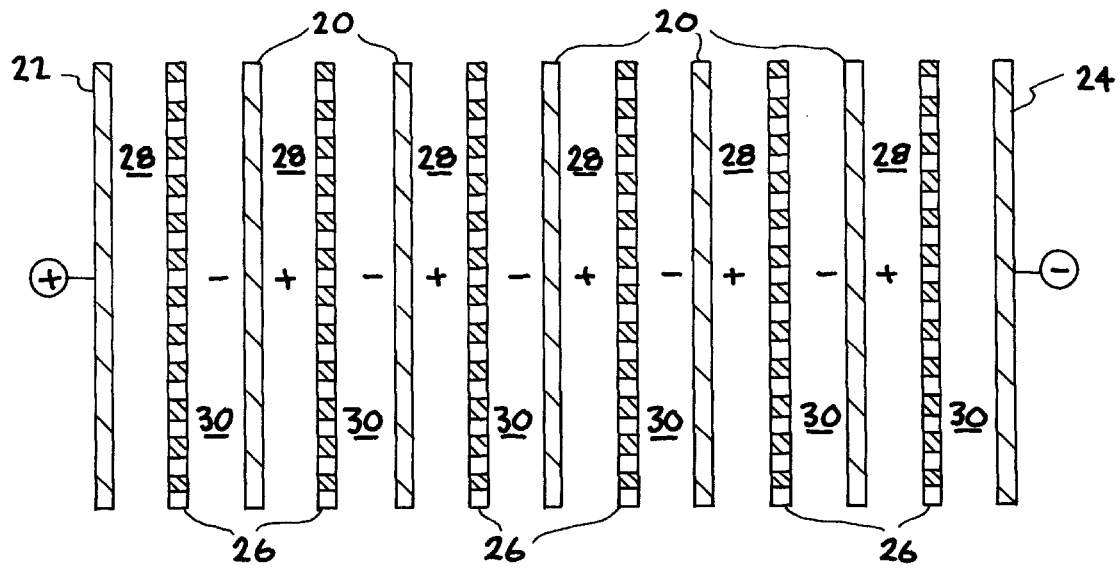
FIG. 2 shows an electrochemical cell arrangement in a bipolar electrode mode according to the present invention.

The present invention can also be used in a bipolar mode, shown in FIG. 2, which might provide cost advantages in a commercial cell. The cell has a plurality of bipolar electrodes 20 between the outer anode 22 and cathode 24. A membrane 26 between each pair of electrodes separates the cell into a plurality of anolyte flow channels 28 and catholyte flow channels 30. The total cell voltage is the sum of the individual sub-cells.

The organic waste material to be destroyed can be introduced into the anolyte in either a batch mode or a continuous feed mode. In the batch mode, the organic is added directly into the anolyte reservoir at the beginning of a run. In the continuous feed mode, the organic may be pumped using a metering pump through a small tube into the anolyte reservoir.

The Co(III) mediator is generated at the anode of the electrochemical cell and is dispersed throughout the anolyte solution. Cobalt is typically added to the anolyte in the form of a cobalt salt, such as cobalt nitrate ($Co(NO_3)_2$), and cobalt ions are then oxidized at the anode to form the mediator, as given in Reaction (1). The concentration of cobalt in the anolyte should not exceed its solubility limit in the acidic solution.

$$Co^{2+} \Rightarrow Co^{3+}+e^- \tag{1}$$

Co(III) and nitric acid react with the organic material to form carbon dioxide, and in the process reduce the mediator to Co(II). Hetero-atoms present in the organic waste are oxidized and remain in solution until they are removed in a batch electrolyte regeneration process. Reactions (2) and (3) show representative stoichiometric reactions for ethylene glycol and 1,3-dichloro-2-propanol, respectively. The chlorine gas produced in Reaction (3) is removed from the system in a secondary process.

$$(CH_2OH)_2+10Co^{3+}+2H_2O \Rightarrow 2CO_2+10Co^{2+}+10H^+ \tag{2}$$

$$C_3H_5(OH)Cl_2+16Co^{3+}+5H_2O \Rightarrow 3CO_2+16Co^{2+}+16H^++Cl_2 \tag{3}$$

If the organic waste also contains a radioactive component, such as a transuranic oxide, then the Co(III) mediator converts the oxide into a soluble species that can be separated and recovered in a preferred form. Reaction (4) is a representative stoichiometric reaction for plutonium oxide.

$$PuO_2+2Co^{3+} \Rightarrow PuO_2^{2+}+2Co^{2+} \tag{4}$$

Upon oxidation of the organic (or transuranic) by the mediator, the reduced species Co(II) is then reoxidized at the anode and the cycle repeats until the desired amount of oxidizable material in the anolyte is depleted. Thus, the mediator is continually replenished. Organic destruction efficiencies of 95–99% have been achieved using this process.

Although nitric acid is not shown as a reactant in Reactions (2) and (3), nitric acid is involved in intermediary reactions that produce free radicals, which are effective in breaking down the organic components. An important advantage of the nitric acid system over a sulfuric acid system is that nitric acid is a more powerful oxidant, and the organics are attacked and destroyed more efficiently. In addition, the nitric acid is not as corrosive as sulfuric acid in regard to the anodes. A sulfuric acid electrolyte solution (including $Co^{3+}$, free radicals, organics, chlorine, and sulfuric acid) readily corrodes and dissolves the electrode material, reducing the lifetime of the electrodes and releasing trace metals into the electrolyte that then require special disposal or recovery processes.

The electrochemical current loop is completed by the cathode reaction, given in Reaction (5), which is the reduction of nitrate ions in the nitric acid catholyte to nitrite ions. In nitric acid based systems, the reduction of nitrate is the dominant cathodic reaction when the concentration of nitrate is greater than 2 M.

$$NO_3^-+2H^++2e^- \Rightarrow NO_2^-+H_2O \tag{5}$$

The nitrous acid ($HNO_2$) generated may be removed (pumped) directly from the system and the catholyte replenished with nitric acid. Alternatively, the reaction-generated nitrous acid may be converted back to nitric acid. Nitrous acid that is not removed or converted eventually decomposes to form $NO_x$, as given in Reaction (6). $NO_x$ species that are produced may be removed from the system using scrubbers.

$$2HNO_2 \Rightarrow H_2O+NO+NO_2 \tag{6}$$

The formation of $NO_x$ species may be avoided by contacting the nitrous acid with oxygen gas ($O_2$), which oxidizes the nitrous acid and regenerates nitric acid, as represented in Reaction (7).

$$2HNO_2+O_2 \Rightarrow 2HNO_3 \tag{7}$$

Since oxygen is only very sparingly soluble in an aqueous solution, a turbo-aerator was developed at Lawrence Livermore National Laboratory which achieves very high efficiencies in a small volume. The turbo-aerator draws the gas and the fluid together, and passes them through a row of stator blades which disperses the gas into very small bubbles. This device is installed in the catholyte flow loop, and the advantages of intimate mixing and the high surface area contribute to efficient reoxidation to nitrate.

The cell separator, typically a membrane, is used in the system to concentrate the organic waste on the anolyte side, and to prevent nitrous acid formed at the cathode from migrating to the anolyte side and being reoxidized at the anode, causing loss of current efficiency. The separator is often a cationic membrane, although a porous polymer or ceramic membrane can also be used. Suitable cell membranes include Zitex A-125, a porous plastic, and Nafion 117.

There is a net accumulation of water in the system due to the addition of organics and to Reaction (5). Water may be removed from the system using an evaporator in conjunction with a fractionation column. The electrolyte is passed through the evaporator and a small amount is evaporated off, enough to remove the extraneous water. The concentrated electrolyte is then returned to the cell. The vapor from the evaporator contains both water and nitric acid, which are separated in the fractionation column. The column can be designed to produce water which is directly sewerable, while the acid is reused.

The present process is able to break down the vast majority of organic materials, such as alcohols, alkenes, carboxylic acids, chloro-/amino-/nitro-/phospho-hydrocarbons, aromatics, ketones, aldehydes, and aliphatic chains. However, the functionalities present in the organic molecules play a significant role in the ease of oxidation. In general, the more oxidizable functional groups an organic material has, the more effective MEO will be in destroying the material. At one extreme, alcohol, double bond, and carboxylic acid groups greatly facilitate the oxidation process; at the other extreme, aliphatic hydrocarbons exhibit slow oxidation. Most organics fall somewhere in between, with more —OH groups and fewer C—H or C—C bonds accelerating the oxidation. Typically, slow or insignificant oxidation occurs if no favorable functionalities are present. The only functional group that has exhibited no oxidation is the C—F bond, such as contained in polytetrafluoroethylene (Teflon), polyvinylidenefluoride (Kynar), and fluoroelastomers (Viton). These polymers make excellent materials for construction of MEO systems due to this inert quality.

To improve oxidation efficiency, the surface area of contact between the mediator, Co(III), and organic materials should be maximized. For soluble organics, this is not a problem as the organic is dispersed homogeneously throughout the anolyte. For insoluble or immiscible compounds, this contact issue can be a significant factor. For organic substrates such as benzene, toluene, and dodecane, the organic compound may simply float on the top of the electrolyte solution (or sink to the bottom), and conversion to carbon dioxide is exceedingly slow.

To process otherwise immiscible organics, emulsions can be formed of a mixture of the organic material and water, with a commercial surfactant added. The mixture is sonicated to a milky appearance and slowly fed into the anolyte reservoir of the cell. Using this technique, conversion of immiscibles (e.g., toluene) to carbon dioxide is nearly quantitative. The emulsion may also be fed through an atomizer, which sprays a fine mist of the emulsion into the anolyte reservoir, further enhancing the surface area contact. Different classes of surfactants have been tried to determine their stability in the MEO environment; surfactants based on trialkyl amine oxides are suitable. Solid organic waste can be introduced in a finely powdered form.

The materials of cell construction are chosen carefully, as the combination of powerful oxidants, organic fragments, free radicals, and chlorine species drastically shortens the lifetime of many cell components. Typical signs of failure or loss of mechanical integrity are swelling, dissolving, fracturing, excessive weight loss or gain, and perforation. As noted above, plastics containing C—F bonds are quite durable; the oxidizing power of the MEO system is not sufficient to break these bonds. The plastics polyvinylidene fluoride (Kynar), polyethylene, ethylenetetrafluoroethylene, and polychlorotrifluoroethylene, and the metals tantalum and niobium, perform satisfactorily. Glass has some value as a construction material, but is limited by its fragile mechanical properties. Teflon (polytetrafluoroethylene) exhibits no evidence of corrosion in any of the parts used in the cell systems, such as tubing and pump gears.

The durability of electrode materials has proven to be a serious problem due to the corrosive MEO environment in the cell. In a sulfuric acid system, platinum appeared at first to be an effective anode material, but upon further investigation, the electrodes suffered significant degradation. Numerous anode materials coated with platinum were tested, and the platinum coating peeled off or otherwise separated from the base metal, leading to attack on the substrate. The shortened lifetime of the electrodes, as well as the leaching of platinum into the anolyte, would be prohibitively expensive in a large scale system. Consequently, the Co(III)/$HNO_3$ system was chosen (in part) to avoid this problem, since the nitric acid based system does not attack the anodes as readily.

Corrosion resistant materials, e.g., platinum, tantalum and niobium, in the form of metal strips may be used as electrodes, or a metal such as platinum may be clad or otherwise deposited onto less expensive substrates, e.g., stainless steel, copper or nickel. Better performance is obtained with clad materials; electroplated or sputter deposited materials often have small pores or uneven coating thickness. These small defects drastically lower the lifetime of the sputtered or electrodeposited materials, as the anolyte solution seeps through these pores and attacks the substrate material from underneath the coating.

EXAMPLE

Two different types of cells have been used for the organics destruction: an H-cell and a flat plate cell. The anolyte and catholyte reservoirs are sealed and separated by a Nafion 117 membrane. In a single electrode mode H-cell design, one arm of the cell contains a platinum cylinder or strip anode, and a platinum strip cathode in the other arm. For a bipolar electrode mode, each arm of the H-cell would contain a complete electrochemical cell, and the cell separator is a bipolar electrode. The flat plate cell design employs a platinum anode (coated on titanium or niobium) and a cathode made from nickel, titanium, or niobium. The anolyte reservoir is equipped with a thermostated heater and nitrogen gas bubbler for efficient degassing. In a small system where the volume of the anolyte and catholyte reservoirs are one liter each, the system has a capability of up to 20 amps, with a flow rate of 0.5 gpm per cell channel. The system runs at operating temperatures of 30–60° C. The system can be scaled up for production volumes of tens or hundreds of liters.

The mediator concentration ($Co(NO_3)_2$) in the anolyte is about 0.5 M, an amount that allows reasonable current densities without exceeding solubility limits. The nitric acid concentration in the electrolyte can vary from 4–12 M, but optimally is about 8–10 M. The organic waste is introduced into the cell in a batch mode or continuous feed mode, and the off-gas is analyzed for carbon dioxide by passage through an infrared analyzer by means of a peristaltic pump with a continuously measured gas flow rate. By integrating the volume of carbon dioxide produced over the period of a run, a rough estimate of the destruction efficiency is obtained. Samples also may be taken for Total Organic Carbon analysis before and after a run to calculate more accurate destruction efficiencies.

The foregoing description of preferred embodiments of the invention is presented for purposes of illustration and description and is not intended to be exhaustive or to limit the invention to the precise form disclosed. Many modifications and variations are possible in light of the above teaching.

We claim:

1. A method for the destruction of organic waste in an electrochemical cell, comprising:

providing an electrochemical cell comprising an anode, a cathode, and a separator between the anode and cathode, wherein the separator defines an anolyte reservoir containing an anolyte solution and a catholyte reservoir containing a catholyte solution, and wherein the anolyte solution includes a cobalt salt mediator and nitric acid, and the catholyte solution includes nitric acid;

introducing an organic compound into the anolyte solution;

applying a potential across the anode and cathode so as to cause $Co^{2+}$ to be oxidized at the anode to form $Co^{3+}$ and nitric acid to be reduced at the cathode to form nitrous acid;

allowing the organic compound to react with $Co^{3+}$ to form carbon dioxide and $Co^{2+}$ until a desired amount of the organic compound has been destroyed; and replenishing the nitric acid in the catholyte as the reaction proceeds in the anolyte between the organic compound and $Co^{3+}$.

2. The method as recited in claim 1, wherein replenishing the nitric acid in the catholyte is carried out by introducing oxygen gas into the catholyte solution to react with the nitrous acid to form nitric acid.

3. The method as recited in claim 1, wherein the nitric acid concentration in the anolyte and catholyte is between about 4 M and 12 M.

4. The method as recited in claim 1, further comprising removing the nitrous acid from the catholyte and replacing the nitrous acid with nitric acid.

5. The method as recited in claim 1, wherein providing the electrochemical cell further comprises situating at least one bipolar electrode between the anode and the cathode, and situating a separator between each pair of electrodes, wherein the separators define a plurality of anolyte reservoirs containing anolyte solution and a plurality of catholyte reservoirs containing catholyte solution.

* * * * *